(12) United States Patent
Shirakawa et al.

(10) Patent No.: US 6,605,148 B2
(45) Date of Patent: Aug. 12, 2003

(54) FIBER-REINFORCED CEMENT MOLDED PRODUCT, AND PROCESS FOR ITS PRODUCTION

(75) Inventors: Tetsuro Shirakawa, Yokohama (JP); Seiji Inoue, Yokohama (JP)

(73) Assignee: Asahi Glass Company, LImited, Tokyo (JP)

( * ) Notice: Subject to any disclaimer, the term of this patent is extended or adjusted under 35 U.S.C. 154(b) by 0 days.

(21) Appl. No.: 09/925,446

(22) Filed: Aug. 10, 2001

(65) Prior Publication Data

US 2002/0060282 A1 May 23, 2002

(30) Foreign Application Priority Data

Aug. 11, 2000 (JP) ........................................ 2000-244950

(51) Int. Cl.[7] ................................................ C04B 14/18
(52) U.S. Cl. ...................... 106/672; 106/675; 106/676; 106/679; 106/681; 264/333
(58) Field of Search .................................. 106/672, 675, 106/676, 679, 681; 264/333

(56) References Cited

FOREIGN PATENT DOCUMENTS

JP  59128248  *  7/1984

* cited by examiner

*Primary Examiner*—Paul Marcantoni
(74) *Attorney, Agent, or Firm*—Oblon, Spivak, McClelland, Maier & Neustadt, P.C.

(57) ABSTRACT

A molded product which has a high strength and which is excellent in surface smoothness and freezing damage resistance. It comprises a fiber-reinforced cement molded OK product which has a bulk specific gravity of from 0.9 to 1.2, and which comprises, by mass, from 2 to 15% of hollow particles, from 1 to 40% of an inorganic admixture having pores which are open to the surface, from 5 to 70% in total of cement and/or lime, from 0 to 50% of slag, from 0 to 50% of gypsum, from 20 to 60% of a quartzite powder, from 0 to 20% of micro silica, from 0 to 30% of an inorganic aggregate other than the above components and from 2 to 30% of cellulose fibers.

15 Claims, No Drawings

FIBER-REINFORCED CEMENT MOLDED PRODUCT, AND PROCESS FOR ITS PRODUCTION

BACKGROUND OF THE INVENTION

1. Field of the Invention

The present invention relates to a fiber-reinforced cement molded product and a process for its production.

2. Discussion of Background

A mechanism of how freezing damage of a cement molded product occurs is considered, according to "hydraulic pressure theory" by T. C. Powers, that movement of non-frozen water corresponding to the amount of cubical expansion when water freezes into ice generates a hydrostatic pressure due to viscosity resistance, and destroys a structure. In order to prevent freezing damage by this mechanism, a method of introducing a space filled with air in a cement molded product to absorb the generated hydrostatic pressure has been employed. It is known that the effect for preventing freezing damage is high when the amount of the space introduced is large in this method.

As one technique for introducing the space to absorb stress due to the hydrostatic pressure, a method of adding hollow particles may be mentioned (JP-A-08-217561). However, in this method, it is necessary to add a large amount of hollow particles to obtain adequate freezing damage resistance, and there are problems such as decrease in bending strength and decrease in surface smoothness due to aggregation of said hollow particles.

SUMMARY OF THE INVENTION

The present invention has been made to overcome the above-mentioned problems of prior art, and it is an object of the preset invention to provide a fiber-reinforced cement molded product which has a high strength and which is excellent in surface smoothness and freezing damage resistance, and a process for its production.

The present invention provides a fiber-reinforced cement molded product which contains from 2 to 15% of hollow particles and from 1 to 40% of an inorganic admixture having pores which open to the surface, and which has a bulk specific gravity of from 0.9 to 1.2.

Here, in the present specification, "%" means percentage by mass and "part" means part by mass, unless otherwise specified. Further, "mean particle diameter" means a median diameter when a particle size distribution is measured, i.e. a mode diameter.

Such a fiber-reinforced cement molded product is excellent in freezing damage resistance, and a product of which has a high strength and a good surface smoothness.

The fiber-reinforced cement molded product of the present invention preferably contains, in addition to the hollow particles and the inorganic admixture having pores which open to the surface, from 5 to 70% in total of cement and/or lime, from 0 to 50% of slag, from 0 to 50% of gypsum, from 20 to 60% of a quartzite powder, from 0 to 20% of microsilica, from 0 to 30% of an inorganic aggregate other than the above components and from 2 to 30% of cellulose fibers.

Further, in the present invention, the hollow particles are preferably inorganic hollow particles having particle diameters of from 20 to 1000 μm, and the inorganic admixture having pores which open to the surface is preferably a perlite ground powder and/or a cement product ground powder having a bulk specific gravity of from 0.1 to 0.5.

The present invention further provides a process for producing a fiber-reinforced cement molded product, which comprises adding an organic admixture and water to a material mixture containing, as calculated as solid content, from 2 to 15% of hollow particles and from 1 to 40% of an inorganic admixture having pores which open to the surface, followed by mixing to obtain a hydraulic slurry, subjecting said hydraulic slurry to dehydration molding into a predetermined shape to form an intermediate molded product, and subjecting said intermediate molded product into curing.

By employing such a process, a pattern can easily be formed on the surface of said product, and a high strength can be obtained in early stages.

DETAILED DESCRIPTION OF THE PREFERRED EMBODIMENTS

As mentioned above, in the cement molded product, movement of non-frozen water generates a hydrostatic pressure due to viscosity resistance, which becomes a stress to destroy a structure. Namely, the hydrostatic pressure (stress) relates to the degree of resistance during movement of moisture and movement distance (distance to the space for absorption) of moisture. Accordingly, the present inventors have considered to make a structure portion other than the hollow particles have a high water permeability to reduce resistance during moisture movement, in order to reduce addition amount of the hollow particles and in order not to increase the hydrostatic pressure even in a case where the distance to the space for absorption is long.

In the present invention, it is essential that the bulk specific gravity of the fiber-reinforced cement molded product is within a range of from 0.9 to 1.2. If the bulk specific gravity is less than 0.9, the strength of the fiber-reinforced cement molded product tends to decrease, and on the other hand, if the bulk specific gravity exceeds 1.2, the fiber-reinforced cement molded product tends to be hard, and processability tends to be poor.

In the present invention, it is essential that the content of the hollow particles is from 2 to 15%. If the content of the hollow particles is less than 2%, the distance to the space for absorption tends to be long, and movement distance of the non-frozen water tends to be long, whereby the stress can not be reduced, and the freezing damage resistance tends to be poor. If the content of the hollow particles exceeds 15%, the hollow particles are less likely to disperse uniformly in the material, and the surface smoothness tends to decrease due to aggregation, and the strength of the fiber-reinforced cement molded product also tends to decrease.

In the present invention, the purpose of use of the hollow particles is to disperse a space to absorb the stress generated along with freezing of moisture into the material, and to improve freezing damage resistance. Accordingly, it is necessary that the hollow particles themselves do not absorb water and the space in the particles is not filled with moisture, and the hollow particles are required to be completely sealed. As hollow particles which satisfy these conditions, inorganic hollow particles are particularly preferred, and fly ash balloon, glass balloon or volcanic ash balloon may, for example, be mentioned.

The hollow particles are preferably hollow particles having particle diameters of from 20 to 1000 μm. If the particle diameters of the hollow particles are less than 20 μm, if the thickness of the shell of the particles is at a level of 10 μm, the space in the particles disappears, and the particles are not hollow particles but solid particles, and accordingly the freezing damage resistance tends to be poor. Further, even if they are hollow particles, the thickness of the shell of the particles tends to be thin, the strength of the shell tends to decrease, and the particles are likely to be destroyed in a process of producing the fiber-reinforced cement molded product, and accordingly the freezing damage resistance tends to be poor. On the other hand, if the sizes of the hollow particles exceed 1000 μm, the surface smoothness tends to decrease, such being unfavorable.

In the present invention, it is essential that the content of the inorganic admixture having pores which open to the surface is from 1 to 40%. If the content of the inorganic admixture having pores which open to the surface is less than 1%, no adequate water permeability can be imparted to the structure portion other than the hollow particles, whereby the viscosity resistance tends to increase, and the freezing damage resistance tends to decrease. If the content exceeds 40%, the bulk specific gravity of the fiber-reinforced cement molded product tends to be small, whereby the strength tends to decrease, or the coefficient of water absorption of the fiber-reinforced cement molded product tends to be high, whereby freezing damage resistance tends to decrease.

In the present invention, the inorganic admixture having pores which open to the surface has the following function. Freezing of moisture in the molded product proceeds in the coexistence of frozen water with non-frozen water. Movement of non-frozen water corresponding to the amount of cubical expansion of frozen water generates a hydrostatic pressure due to viscosity resistance. The inorganic admixture having pores which open to the surface can make the structure have a high water permeability, and has an effect of making the movement of non-frozen water easy and reducing the hydrostatic pressure.

Accordingly, the inorganic admixture having pores which open to the surface in the present invention is such a substance that it is a mineral solid at room temperature, it has pores in its interior, a part or all of the pores open to the outer surface of said mineral solid, and when the mineral solid is impregnated in water, many of the pores are filled with water. Such pores has a water permeation function, i.e. they function as a pipe, in the fiber-reinforced cement molded product. As such an inorganic admixture having pores which open to the surface, a perlite ground powder or a cement product ground powder (such as a ground powder of a fiber-reinforced cement product) may, for example, be mentioned.

Among them, particularly preferred is a perlite ground powder and/or a cement product ground powder having a bulk specific gravity of from 0.1 to 0.5. Namely, if the bulk specific gravity of the inorganic admixture is less than 0.1, the inorganic admixture is less likely to disperse uniformly in the material and is likely to aggregate, whereby the surface smoothness tends to decrease. If the bulk specific gravity exceeds 0.5, the amount of pores tends to be small, and the structure water permeability tends to decrease, whereby the freezing damage resistance tends to be poor, such being unfavorable. Further, since the inorganic admixture is required to be uniformly dispersed in the structure, preferred is a perlite ground powder and/or a cement product ground powder.

In the present invention, the total content of cement and/or lime is preferably from 5 to 70%. The cement and lime have the following effect. $Ca(OH)_2$ and $SiO_2$ formed in a hydration reaction of the cement undergo a hydrothermal reaction to form a hydrate such as $CaO—SiO_2—H_2O$ system and/or tobermorite. Such $CaO—SiO_2—H_2O$ system and tobermorite are excellent in durability and strength properties.

If the total content of the cement and lime is less than 5%, a large amount of a non-reacted $SiO_2$ content remains, and the strength tends to be low. On the other hand, if the total content of the cement and lime exceeds 70%, a large amount of a non-reacted $Ca(OH)_4$ content remains, the material is likely to undergo carbonation due to carbon dioxide gas, whereby durability tends to decrease. The total content of the cement and lime is preferably within a range of from 40 to 60%.

As such a cement, Portland cement, alumina cement, sulfate resisting cement, Portland blast furnace cement or Pozzolan cement may, for example, be mentioned. Among them, preferred is Portland cement or alumina cement since they have high early strength properties, and they are less likely to form ettringite or monosulfate hydrate as an intermediate product, whereby tobermorite tends to be easily formed.

Slag is not an essential component, but the following advantages can be obtained by its incorporation. Reaction of $Al_2O_3$ in the slag makes formation of tobermorite easy, and the bending strength improves. However, if the content of the slag exceeds 50%, generation of e.g. $H_2S$ tends to be remarkable in an autoclave for curing. More preferred content of the slag is from 2 to 10%.

As the slag, preferred is a blast furnace slag impalpable powder. One having a plain specific surface area of at least 4000 $cm^2/g$ and containing $SiO_2$, $Al_2O_3$ and $CaO$ as the main components can be preferably used.

Gypsum is not an essential component, but such advantages can be obtained by its incorporation such as improvement in plasticity of the material and reduction in e.g. split. However, if the content of the gypsum exceeds 50%, ettringite or monosulfate hydrate as an intermediate product is likely to be formed, and tobermorite as an end product is less likely to be formed. More preferred content of the gypsum is from 2 to 10%.

In the present invention, the content of the quartzite powder is preferably from 20 to 60%. The quartzite powder has the following effects. It undergoes a hydrothermal reaction with $Ca(OH)_2$ to form a hydrate such as $CaO—SiO_2—H_2O$ system and/or tobermorite. Preferred as the quartzite powder is a quartzite impalpable powder having a high crystallinity from such a viewpoint that $CaO—SiO_2—H_2O$ system and/or tobermorite is likely to be formed. If the content of the quartzite powder is less than 20%, deterioration with time due to carbonation tends to be remarkable, and if it exceeds 60%, the strength tends to decrease.

Microsilica is not an essential component, but since it is ultrafine particles having a mean particle diameter of from 0.1 to 1 μm, the particles are packed in between e.g. cellulose fibers, whereby the surface design property tends to be improved. However, if the content of the microsilica exceeds 20%, dehydration properties tends to decrease.

As the microsilica, preferred is fumed silica which is siliceous dust generated during production of ferrosilicon or during production of desilicated zirconia. As the microsilica, preferred is one having a $SiO_2$ component of at least 80%. Further, the plain specific surface area of the microsilica is preferably at least 10 $m^2/g$, more preferably at least 20 $m^2/g$.

An inorganic aggregate other than the above components (hereinafter referred to simply as "inorganic aggregate") is not an essential component, but the following advantages can be obtained by its incorporation. For example, when magnesium oxide is incorporated, stability of a hydrate tends to increase, whereby long term durability tends to improve. Further, calcium carbonate or mica improves dimensional stability without impairing reactivity of e.g. cement. However, if the content of the inorganic aggregate exceeds 30%, the strength tends to be low.

In the present invention, the content of the cellulose fibers is preferably from 2 to 30%. If the content of the cellulose fibers is less than 2%, the strength of the fiber-reinforced cement tends to decrease, and if it exceeds 30%, the cellulose fibers are less likely to be dispersed uniformly in the material. As the cellulose fibers, preferred is one having an average fiber length of from 1.5 to 3.0 mm, since fluidity of the slurry becomes high and more uniform dispersion becomes possible.

An organic admixture other than cellulose fibers (hereinafter referred to simply as "organic admixture") is not an essential component, but the following advantages can be obtained by its incorporation. For example, since a polyvinyl alcohol powder dissolves at from 50 to 150° C., it spreads among the intermediate during curing of the intermediate, and the strength improves. However, if the content of the organic admixture exceeds 2% by outer percentage, incombustibility tends to decrease.

Such a fiber-reinforced cement molded product can be produced, for example, as follows. Firstly, as a material mixture, as calculated as solid content, from 2 to 15% of the hollow particles, from 1 to 40% of the inorganic admixture having pores which open to the surface, from 5 to 70% of cement and/or lime, from 0 to 50% of slag, from 0 to 50% of gypsum, from 20 to 60% of a quartzite powder, from 0 to 20% of microsilica, from 0 to 30% of an inorganic aggregate other than the above components, from 2 to 30% of cellulose fibers, and from 0 to 2% by outer percentage of an organic admixture other than cellulose fibers are blended.

The above material mixture is mixed with water to obtain a slurry having a content of solid contents at a level of from 10 to 30%. This slurry is formed into a predetermined shape by a method such as sheet making, dehydrating press or frame casting to obtain an intermediate. Then, the intermediate is subjected to curing to form a fiber-reinforced cement molded product. As the curing method, preferred is a method of carrying out wet curing under saturated vapor pressure at from 60 to 80° C., and further carrying out curing by an autoclave under high pressure at a high temperature of from 140 to 180° C., in view of e.g. productivity and performance.

EXAMPLES

To a pulp sheet to be used as cellulose fibers, water was added so that the solid content concentration would be 3.5%, followed by pulping by a pulper to obtain pulp water. Then, materials were blended so that the blend ratio would be as identified in Table 1, and the above-described pulp water and water for dilution were added thereto, followed by mixing by a mixer to obtain a slurry having a solid content concentration of 25%.

Then, the slurry was dehydrated under elevated pressure to obtain an intermediate molded product having a thickness of 12 mm. Said intermediate molded product was subjected to curing at 80° C. under saturated vapor pressure for 8 hours, and then subjected to curing by an autoclave at 160° C. for 15 hours to prepare a test specimen. Further, a material mixture prepared so that the blend ratio was the same as identified in Table 1 except that no hollow particles were blended, was treated in the same method to prepare a test specimen for measuring structure water permeability.

The materials used were as follows.

Cement: Portland cement, tradename "Ordinary Portland Cement", manufactured by Mitsubishi Materials Corporation Quartzite powder: Tradename "Fine Quartzite Powder", manufactured by Chichibu Kogyo Inorganic aggregate: Tradename "Industrial Water Mag (magnesium hydroxide)", manufactured by Asahi Glass Company, Limited; and tradename "TR-352 (calcium carbonate)", manufactured by Okutama Kogyo Cellulose fibers: Tradename "Virgin Pulp", manufactured by Harmac Hollow particles: (1) Fly ash balloon: tradename "Yeasphears", manufactured by Taiheiyo Cement Corporation, mean particle diameter: 130 μm, (2) fly ash balloon: tradename "CF beads", manufactured by Union Kasei, mean particle diameter: 150 μm, (3) glass balloon: tradename "Cellstar", manufactured by Tokai Kogyo Co., Ltd., mean particle diameter: 55 μm, (4) aluminosilicate balloon: tradename "ASB", manufactured by Riball, particle diameter: 20–600 μm Perlite ground powder: Tradename "52-S", manufactured by Toko Perlite Cement product ground powder: Manufactured by Asahi Glass Company, Limited With respect to each sample, the bulk specific gravity, freezing damage resistance, structure water permeability, bending strength and surface smoothness were measured, and the results are shown in Table 1. The bulk specific gravity was measured in accordance with a bulk specific gravity test of JIS A5413. With respect to the freezing damage resistance, freezing and thawing cycle test was carried out in accordance with ASTM C666-A method with respect to a test specimen which absorbed water for 24 hours, and the rate of change in thickness after 50 cycles was measured to evaluate the freezing damage resistance.

The structure water permeability was measured in accordance with water permeability resistance test of JIS A5422. The test of the structure water permeability was carried out with respect to the test specimen consisting of the material mixture except for the hollow particles in the blend ratio as identified in Table 1. The reason is that the hollow particles do not absorb water, whereby they do not relate to movement of non-frozen water.

The bending strength was measured in accordance with breaking load test of JIS A5422.

The surface smoothness was evaluated by sensory test. The test was carried out by five judges by five-grade method (samples were graded into five grades according to surface smoothness so that one which was most excellent in smoothness received a grade of 5 and one which was poorest received a grade of 1) and a sample with an average grade of at most 2 is rated as X, a sample with an average grade of from 3 to 4 is rated as ◯, and a sample with an average grade of at least 4 is rated as ◎.

In Examples 1 to 5 which are Examples of the present invention, a fiber-reinforced cement molded product which has no problem in bending strength and surface smoothness and which is excellent in freezing damage resistance could be obtained.

In Example 6 (Comparative Example), although there was no problem in freezing damage resistance, the strength and surface smoothness were poor. In Example 7 (Comparative Example), the addition amount of the hollow particles was reduced while the structure water permeability was low, whereby no adequate freezing damage resistance could be obtained.

TABLE 1

| | Unit | Ex. 1 | Ex. 2 | Ex. 3 | Ex. 4 | Ex. 5 | Ex. 6 | Ex. 7 |
|---|---|---|---|---|---|---|---|---|
| Portland cement | part | 34 | 34 | 34 | 34 | 38 | 31 | 32 |
| Quartzite powder | part | 29 | 29 | 29 | 29 | 29 | 29 | 29 |
| Cellulose fibers | part | 6 | 6 | 6 | 6 | 6 | 6 | 6 |
| Magnesium oxide | part | 2 | 2 | 2 | 2 | 2 | 9 | 21 |
| Calcium carbonate | part | 5 | 5 | 5 | 5 | 7 | 5 | 7 |
| Yeaspheres | part | 10 | | | | 4 | 20 | 5 |
| CF beads | part | | 10 | | | | | |
| Cellstar | part | | | 10 | | | | |
| ABS | part | | | | 10 | | | |
| Perlite ground powder | part | 0 | 0 | 0 | 0 | 4 | 0 | 0 |
| Cement product ground powder | part | 14 | 14 | 14 | 14 | 10 | 0 | 0 |
| Bulk specific density | — | 1.09 | 1.08 | 1.07 | 1.06 | 1.08 | 0.98 | 1.09 |
| Freezing damage resistance (rate of change in thickness) | % | 0.0 | 0.0 | 0.1 | 0.0 | 0.1 | 0.0 | 1.1 |
| Structure water permeability | ml/hr | 8.0 | 8.2 | 8.5 | 8.7 | 9.8 | 6.7 | 6.8 |
| Bending strength | N/mm$^2$ | 12.5 | 13.5 | 11.7 | 12.1 | 10.7 | 8.6 | 9.7 |
| Surface smoothness | — | ⊚ | ⊚ | ⊚ | ⊚ | ⊚ | x | ⊚ |

In the present invention, by making a structure portion have a high water permeability, a fiber-reinforced cement molded product which is excellent in freezing damage resistance could be obtained by addition of a small amount of hollow particles.

The fiber-reinforced cement molded product of the present invention is excellent in bending strength, surface smoothness and freezing damage resistance.

CROSS-REFERENCE TO RELATED APPLICATION

The entire disclosure of Japanese Patent Application No. 2000-244950 filed on Aug. 11, 2000, including specification, claims and summary are incorporated herein by reference in its entirety.

What is claimed is:

1. A fiber-reinforced cement molded product comprising, by mass, from 2 to 15% of hollow particles and from 1 to 40% of an inorganic admixture having pores which are open to the surface, and which fiber-reinforced cement molded product has a bulk specific gravity of from 0.9 to 1.2.

2. The fiber-reinforced cement molded product according to claim 1, wherein the hollow particles are inorganic hollow particles having particle diameters of from 20 to 1000 μm, and the inorganic admixture having pores which are open to the surface is a perlite ground powder and/or a cement product ground powder having a bulk specific gravity of from 0.1 to 0.5.

3. A process for producing a fiber-reinforced cement molded H product according to claim 1, which comprises adding an organic admixture and water to a material mixture comprising, calculated as solid content, by mass, from 2 to 15% of hollow particles and from 1 to 40% of an inorganic admixture having pores which are open to the surface, followed by mixing to obtain a hydraulic slurry, subjecting the hydraulic slurry to dehydration molding to form an intermediate molded product, and subjecting the intermediate molded product to curing.

4. The process for producing a fiber-reinforced cement molded product according to claim 3, wherein the material mixture comprises, calculated as solid content, by mass, from 2 to 15% of hollow particles, from 1 to 40% of an inorganic admixture having pores which are open to the surface, from 5 to 70% in total of cement and/or lime, from 0 to 50% of slag, from 0 to 50% of gypsum, from 20 to 60% of a quartzite powder, from 0 to 20% of microsilica, from 0 to 30% of an inorganic aggregate other than the above components, from 2 to 30%, by mass, of cellulose fibers and from 0 to 2% as calculated as solid content of an organic admixture other than cellulose fibers, adding water to said material mixture followed by mixing to obtain a hydraulic slurry.

5. The process for producing a fiber-reinforced cement molded product according to claim 3, wherein the hollow particles are inorganic hollow particles having particle diameters of from 20 to 1000 μm, and the inorganic admixture having pores which open to the surface is a perlite ground powder and/or a cement product ground powder having a bulk specific gravity of from 0.1 to 0.5.

6. The process for producing a fiber-reinforced cement molded product according to claim 4, wherein the hollow particles are inorganic hollow particles having particle diameters of from 20 to 1000 μm, and the inorganic admixture having pores which open to the surface is a perlite ground powder and/or a cement product ground powder having a bulk specific gravity of from 0.1 to 0.5.

7. The process for producing a fiber-reinforced cement molded product according to claim 4, wherein the organic admixture other than cellulose fibers is a polyvinyl alcohol powder.

8. The process according to claim 3, wherein the hollow particles comprise at least one of fly ash balloons, glass balloons, alumino silicate balloons or volcanic ash balloons.

9. The fiber-reinforced cement molded product according to claim 1, wherein the inorganic admixture having pores which open to the surface is a perlite ground powder or a cement product ground powder.

10. The fiber-reinforced cement molded product according to claim 1, wherein the hollow particles comprise at least one of fly ash balloons, glass balloons, alumino silicate balloons, or volcanic ash balloons.

11. A fiber-reinforced cement molded product prepared by the process of claim 3.

12. A fiber-reinforced cement molded product prepared by the process of claim 4.

13. A fiber-reinforced cement molded product prepared by the process of claim 5.

14. A fiber-reinforced cement molded product prepared by the process of claim 6.

15. A fiber-reinforced cement molded product comprising, by mass, from 2 to 15% of hollow particles and from 1 to 40% of an inorganic admixture having pores which are open to the surface, and which fiber-reinforced cement molded product has a bulk specific gravity of from 0.9 to 1.2, wherein the hollow particles are inorganic hollow particles having particle diameters of from 20 to 1000 $\mu$m, and the inorganic admixture having pores which are open to the surface is a perlite ground powder and/or a cement product ground powder having a bulk specific gravity of from 0.1 to 0.5.

\* \* \* \* \*